United States Patent Office 2,861,912
Patented Nov. 25, 1958

2,861,912
METHOD FOR COMBATING PESTS AND PREPARATIONS SUITABLE THEREFOR

Richard Sallmann, Binningen, Switzerland, assignor to Ciba Limited, Basel, Switzerland, a Swiss firm No Drawing. Application January 30, 1956
Serial No. 561,976

Claims priority, application Switzerland
September 25, 1951

11 Claims. (Cl. 167—22)

The present application is a continuation-in-part of my copending application Serial No. 310,533, filed September 19, 1952 (and abandoned since the filing of the present application) and is concerned with a method for combating pests and preparations suitable therefor.

According to the present invention objects can be protected against pests, e. g. insects like flies, mosquitoes, aphids or spider mites by treating the objects with an effective amount of a condensation product from 1 mol of chloral and 1 mol of a phosphite ester of the general formula

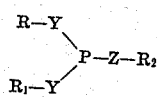

wherein each of R and $R_1$ represents a radical selected from the group consisting of aliphatic radicals containing 1 to 4 carbon atoms, and aryl radicals containing one carbocyclic 6-membered ring, $R_2$ represents an aliphatic radical containing 1 to 4 carbon atoms, X and Y are each a member selected from the group consisting of oxygen, nitrogen and sulfur, and Z is a member selected from the group consisting of oxygen and sulfur.

Among the compounds of the above formula those in which the symbols X, Y and Z represent oxygen are most easily accessible. They correspond to the general formula

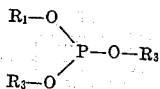

and can be made by methods in themselves known.

The aliphatic radicals, represented by the symbols $R_1$, $R_2$ and $R_3$ may have straight or branched chains and may be saturated or unsaturated. Moreover, they may be unsubstituted or may contain substituents. There may be mentioned for example, the following groups: Methyl, ethyl, propyl isopropyl, butyl, allyl, and 2-chlorethyl groups. The three radicas $R_1$, $R_2$ and $R_3$ may be the same or different. For example there may be mentioned the following compounds; trimethyl phosphite, triethyl phosphite, tripropyl phosphite, tri-(2-chlorethyl) phosphite or the ester of the formula

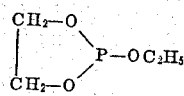

The aromatic radicals which $R_1$ and $R_2$ may represent, may, if desired, contain nuclear substituents. There may be mentioned phenyl, 2- or 4-chlorophenyl, 2:4-dichlorophenyl, 4-methoxyphenyl or 4-nitrophenyl groups. There may be mentioned e. g. 2:4-dichlorophenyl- diethyl phosphite and 4-chlorophenyl-dimethyl phosphite.

For the purposes of the present invention compounds which are obtained from phosphites of the above given formula wherein X, Y and Z represent oxygen are preferable to ethers. Especially valuable are condensation products from chloral and trialkyl phosphite and alkyl groups of which contain 1 to 4 carbon atoms. The most preferred compound is the condensation product from chloral and trimethyl phosphite.

The compounds used in the invention are obtained by reacting together the aforesaid components in molecular proportions. They lead to unitary products, and only one halogen atom enters into reaction, notwithstanding the possibility that two or three molecular proportions of the phosphorus compound could react with one molecular proportion of the carbonyl compound. Since the reaction is frequently exothermic, it may be necessary to react the components while cooling and to dilute them with inert solvents, such as benzene, toluene, ether, dioxane, hexane or low boiling benzine. The reaction is advantageously brought to an end by heating up to about 50–120° C. By suitably choosing the reaction components the condensation products can be distilled under reduced pressure.

The constitution of the condensation products is probably

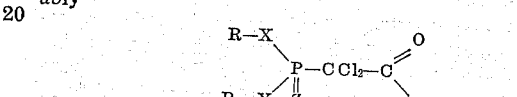

and that of the trimethyl phosphite and chloral

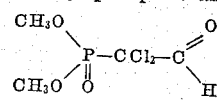

However isomeric formulae can be attributed to the condensation products, like

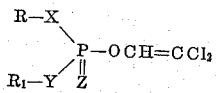

and

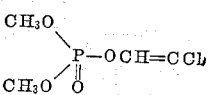

Which of the above formulae is the correct one could not yet be determined. The compounds can therefore properly be described by the process of their manufacture. A general formula which is independent of the process and which includes both isomeric structures is this:

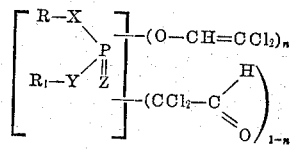

In this formula R, $R_1$, X, Y and Z have the meanings given above and $n$ is zero or one. For the condensation product from trimethyl phosphite and chloral the formula is

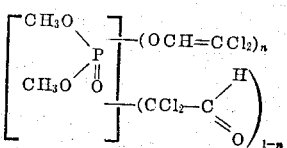

The compounds of the invention are active against the various stages of development of the pests, such as eggs, larvae and imagines, so that they can be used as contact, stomach or respiratory poisons.

They are capable of protecting a very wide variety of materials against pests, and gaseous or liquid or solid materials can be used as carriers for the active substances. As materials to be protected or used as carriers there come into consideration, for example, air, especially in rooms, and liquids such, for example, as water in ponds, and finally any inanimate or living solid substratum such, for example, as any objects in living rooms, cellars, plaster floors, stables, and also pelts, feathers, wool and the like, and also living organisms of the vegetable and animal kingdoms in their various stages of development, insofar as they are insensitive to the pest-combating agents.

The combating of pests may be carried out by the usual methods, for example, by treatment of the material to be protected with the compounds in vapor form, for example, as fumigating agents or in the form of dusts or spraying liquors, for example, in the form of solutions or suspensions prepared with water or suitable organic solvents such, for example, as alcohol, petroleum, tar distillates or the like. There may also be used aqueous solutions or aqueous emulsions of organic solvents containing the active substances, for coating, spraying or impregnating the objects to be protected.

The spraying and dusting preparations may contain the usual inert fillers or identifying agents such, for example, as kaolin, gypsum or bentonite or other additions such as sulfite cellulose waste liquor, cellulose derivatives and the like. Furthermore, in order to improve the wetting or adhesive property the usual wetting agents or adhering agents may be added. The pest-combating preparations may be made in powdered form or in the form of aqueous dispersions or pastes or in the form of self-dispersing oils.

The compounds may be present in the pest-combating preparations as the sole active substance or in combination with other insecticides and/or fungicides. The use of such preparations for plant protection is carried out by the usual spraying, dusting or fumigating methods. Suitably substituted compounds possess an intratherapeutic or so-called systemic action on plants.

The following examples illustrate the invention, the parts being by weight unless otherwise stated, and the relationship of parts by weight to parts by volume being the same as that of the kilogram to the liter:

*Example 1*

In this example is described the preparation of a few of the compounds used in the invention.

(1) A solution of 16.6 parts of triethylphosphite in 20 parts by volume of benzene is added to a solution of 14.7 parts of chloral in 40 parts by volume of benzene. When the temperature no longer increases, the whole is heated for one hour at 60–70° C., ethyl chloride being evolved. The solvent is then distilled off and the residue is fractionated in vacuo. The condensation product boils uniformly at 85–86° C. under 0.05 mm. pressure. The same product can be made without the use of a solvent, but in this case it is necessary to cool with a cooling mixture. The chloral is then added dropwise at about —5° C. while stirring, each drop producing a powerful reaction. In the same manner the condensation product from trimethyl phosphite and chloral can be obtained in the form of a colorless oil boiling at 85–87° C. under 0.2 mm. pressure. The condensation product from tri-isopropyl phosphite and chloral boils at 96–97° C. under 0.1 mm. pressure and can be made in an analogous manner. Similarly, tri-(β-chlorethyl)-phosphite can be reacted with chloral.

(2) A solution of 7.4 parts of chloral in 20 parts by volume of ether is added dropwise to a solution of 6.8 parts of ethyl ethylene phosphite of the formula

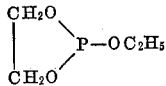

in 20 parts by volume of ether at about —10° C. while stirring. When all the chloral has been introduced, the mixture is heated at the boil for 30 minutes. After distilling off the ether there is obtained an oil which boils with slight decomposition at 94–97° C. under 0.15 mm. pressure.

For the preparation of condensation products also the following phosphite esters may be used

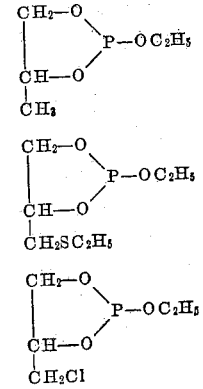

(Condensation product boils at 145–160° C. 10.3 mm. with decomposition)

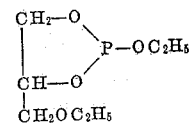

(Condensation product boils at 142–145° C. 10.6 mm.)

(3) A solution of 8 parts of chloral in 5 parts by volume of benzene is added to a solution of 14.1 parts of 2:4-dichlorophenyl diethyl phosphite of the formula

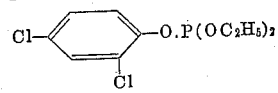

in 5 parts by volume of benzene. The reaction sets in immediately and the temperature rises to 50° C. After the temperature has fallen, the mixture is heated for one hour on the steam bath and then the benzene is distilled off in vacuo. By distilling the residue there is obtained a glycerine-like liquid boiling at 153–157° C. under 0.05 mm. pressure. In a similar manner para-chlorophenyl diethyl phosphite or pentachlorophenyl diethyl phosphite can be caused to react.

(4) A solution of 7.4 parts of chloral in 10 parts by volume of benzene is added dropwise while cooling with ice and stirring to a solution of 11 parts of the compound of the formula

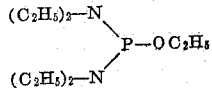

in 20 parts by volume of benzene. When all the chloral has been introduced, the stirring mechanism is stopped and the reaction mixture is allowed to stand for 30 minutes at room temperature and for 90 minutes at 70–80° C. The benzene is then distilled off and the residue is heated in vacuo on a steam bath until its weight remains constant. There are obtained 15.1 parts of a yellow-brown viscous oil. By using instead of chloral an equivalent quantity of trichloroacetic acid ethyl ester there is obtained a pale yellow colored oil boiling at 69° C. under 0.1 mm. pressure.

(5) 4.1 parts of chloral are added dropwise while cooling with ice to 6.1 parts of the compound of the formula

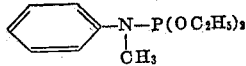

which boils at 91° C. under 0.2 mm. pressure.

Each drop produces a powerful reaction. When the addition is complete the mixture is heated for 15 minutes on a steam bath, whereupon the evolution of gas ceases. After removing the volatile constituents at 80–90° C. in vacuo there are obtained 6.8 parts of a yellowish oil.

(6) 4.5 parts of chloral are mixed with 6.4 parts of triethyl trithiophosphite while cooling with ice. Upon removing the ice, the reaction sets in after a short time which is apparent from the increase in temperature and the evolution of gas. When the temperature no longer increases, the mixture is heated for 30 minutes at 60–70° C. and the volatile constituents are distilled off in vacuo at the same temperature. There are obtained 9.6 parts of a yellowish oil.

*Example 2*

An insecticidal spraying preparation is made up by mixing together 20 parts of the condensation product of trimethyl phosphite and chloral, 40 parts of the condensation product from 1 mol of tertiary octyl phenol and 8 mols of ethylene oxide, and 40 parts of n-butanol. There is obtained a clear solution. This concentrated preparation can easily be diluted with water.

By spraying fruit trees in the summer with a spraying liquor containing 0.2 part percent of the preparation described above (=0.0 part percent of the condensation product) aphides and red spiders can be successfully combated.

For the preparation of spray concentrates other emulsifying agents also may be used. There come into consideration ion-free emulsifying agents, e. g. condensation-products from aliphatic alcohols or amines or carboxylic acids which contain a long chain hydrocarbon radical of about 10–30 carbon atoms with ethylene oxide, such as the condensation product from 1 mol of octadecyl-alcohol and 25–30 mols of ethyleneoxide, the condensation product from 1 mol of soya oil fatty acid and 30 mols of ethylene oxide or that from 1 mol of technical oleylamine and 15 mols of ethyleneoxide or that of 1 mol of dodecyl mercaptan and 12 mols of ethylene oxide. Among the anion-active emulsifying agents which may be used there are named the sodium salt of lauryl sulfonic acid, the sodium salt of dodecyl benzene sulfonic acid, the sodium or triethanol amine salt of oleic acid or of abietic acid or of mixtures of these acids or the sodium salt of petroleum sulfonic acid. Furthermore, cation active emulsifying agents may be used, like dodecyl-pyridinium chloride.

Instead of butanol other organic solvents may be used for preparing the spray concentrate e. g. ethyl alcohol, methanol, isopropanol, acetone, methyl ethylketone, methyl cyclohexanol, benzene, toluene, kerosene, white spirit come into consideration.

Insects which can be combated with the compound of this example are aphids (*Aphidinae*), oleander scale (*Aspidiotus hederae*), European fruit Lecanium (*Eulecanium corni*), oystershell scale (*Lepidosaphes ulmi*), Woolly apple aphid (*Eriosoma lanigerum*), spider mites (*Tetranychidae*).

*Example 3*

The preparation described in Example 2 is also active against Colorado beetles. When potato plants are sprayed with a spraying liquor of 0.2 percent strength (=0.04 percent of active substance) and the larvae of Colorado beetles are placed on the plants after 24 hours, the larvae are paralyzed after a further 24 hours and die after 48 hours.

*Example 4*

1 part of the condensation product from chloral and triethyl phosphite is dissolved in 99 parts of acetone. Coatings produced, e. g. on walls of cellars or stables, with the solution are highly active against house flies (*Musca domestica*). Good activity against flies characterizes also the compounds described in Examples 1 (3) and (4).

*Example 5*

An insecticidal dusting powder can be prepared by mixing 1 part of the condensation product from chloral and trimethyl phosphite with 99 parts of talcum. By dusting areas which are infested with flies and mosquitoes there is obtained a rapid killing of the insects.

Instead of talcum other carriers in powder form, e. g. bentonite, kaolin or mixtures thereof can be used. The amount of active ingredient can be increased to 10 percent or more, or reduced to 0.1 percent or less.

If 0.5 part of the condensation product named above and 1 part of DDT are mixed with 98.5 parts of a powdered carrier, a dusting powder is obtained which exhibits a quick knock down and a long lasting effect.

2 parts of the condensation product named above, 80 parts of sulfur and 18 parts of copper oxychloride are mixed. This is a dusting powder which acts as insecticide and fungicide.

The preferred forms of the pest combating compositions of the present invention are dusting powders and liquids which contain beside the active ingredient a volatile organic solvent and a non-ionogenic emulsifying agent.

What is claimed is:

1. A method for combating insects which comprises applying to the objects which are to be protected against the insects an insecticidal amount of a chloral-phosphite ester condensation product said product being prepared by adding together 1 mol of chloral and 1 mol of a phosphite ester of the general formula

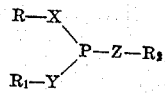

wherein each of R and $R_1$ represents a radical selected from the group consisting of saturated aliphatic hydrocarbon radicals containing 1 to 4 carbon atoms, phenyl radicals and chlorinated phenyl radicals, $R_2$ represents a saturated aliphatic radical containing 1 to 4 carbon atoms, X and Y are each a member selected from the group consisting of oxygen, nitrogen and sulfur, and Z is a member selected from the group consisting of oxygen and sulfur, thus forming a condensation product.

2. A method for combating insects which comprises applying to the objects which are to be protected against the insects an insecticidal amount of a chloral-trialkyl phosphite condensation product said condensation product being formed by adding together 1 mol of chloral and 1 mol of a trialkyl phosphite the alkyl groups of which contain 1 to 4 carbon atoms.

3. A method for combating insects which comprises applying to the objects which are to be protected against the insects an insecticidal amount of the chloral-trimethyl phosphite condensation product said condensation product being formed by adding together 1 mol of chloral and 1 mol of trimethyl-phosphite.

4. A method for combating insects which comprises applying to objects which are to be protected against the insects an insecticidal amount of a chloral-phosphite ester condensation product; said condensation product being formed by adding together 1 mol of chloral and 1 mol of phosphite ester of the general formula

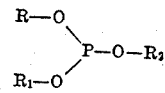

wherein each of R and $R_1$ represents a radical selected from the group consisting of saturated aliphatic hydrocarbon radicals containing 1 to 4 carbon atoms, phenyl radicals and chlorinated phenyl radicals, $R_2$ represents a saturated aliphatic radical containing 1 to 4 carbon atoms.

5. A method for combating insects which comprises applying to objects which are to be protected against the insects an insecticidal amount of a chloral-phosphite ester condensation product; said condensation product being formed by adding together 1 mol of chloral and 1 mol of phosphite ester of the general formula

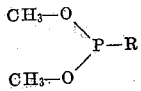

wherein R represents a saturated aliphatic radical containing 1 to 4 carbon atoms.

6. A method for combating insects which comprises applying to the objects which are to be protected against the insects an insecticidal amount of the composition which consists of 20 parts by weight of the trimethyl phosphite-chloral condensation product, said condensation product being formed by mixing together equimolecular proportions of trimethyl phosphite and chloral, 40 parts by weight of the condensation product from 1 mol of octylphenol with 8 mols of ethylene oxide, and 40 parts by weight of n-butanol.

7. A method for combating insects which comprises applying to the objects which are to be protected against the insects an insecticidal amount of a dusting powder which consists of 0.1 to 10 percent by weight of the trimethyl phosphite-chloral condensation product, said condensation product being prepared by mixing together equimolecular proportions of trimethyl phosphite and chloral, and 99.9 to 90 percent by weight of a powdered inert carrier.

8. An insecticidal composition of matter which consists of a chloral-phosphite ester condensation product; said condensation product being prepared by mixing together 1 mol of chloral and 1 mol of a phosphite ester of the general formula

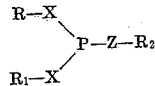

wherein each of R and $R_1$ represents a radical selected from the group consisting of saturated aliphatic hydrocarbon radicals containing 1 to 4 carbon atoms, phenyl radicals and chlorinated phenyl radicals, $R_2$ represents a saturated aliphatic radical containing 1 to 4 carbon atoms, X and Y are each a member selected from the group consisting of oxygen, nitrogen and sulfur, and Z is a member selected from the group consisting of oxygen and sulfur, an organic solvent boiling at atmospheric pressure below 200° C., and an non ionogenic emulsifying agent.

9. An insecticidal composition of matter which consists of 20 parts by weight of a trimethyl phosphite-chloral condensation product, said condensation product being prepared by mixing together equimolecular proportions of trimethyl phosphite and chloral, 40 parts by weight of the condensation product from 1 mol of octyl phenol with 8 mols of ethylene oxide, and 40 parts by weight of n-butanol.

10. An insecticidal dusting powder which consists of a chloral-phosphite ester condensation product said condensation product being prepared by adding together 1 mol of chloral and 1 mol of a phosphite ester of the general formula

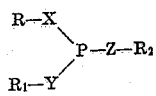

wherein each of R and $R_1$ represents a radical selected from the group consisting of saturated aliphatic hydrocarbon radicals containing 1 to 4 carbon atoms, phenyl radicals and chlorinated phenyl radicals, $R_2$ represents a saturated aliphatic radical containing 1 to 4 carbon atoms, X and Y are each a member selected from the group consisting of oxygen, nitrogen and sulfur, and Z is a member selected from the group consisting of oxygen and sulfur, and a powdered inert carrier.

11. An insecticidal dusting powder which consists of 0.1 to 10 percent by weight of a trimethyl phosphite-chloral condensation product, said condensation product being prepared by adding together equimolecular proportions of trimethyl phosphite and chloral, and 99.9 to 90 percent by weight of a powdered inert carrier.

References Cited in the file of this patent
UNITED STATES PATENTS
2,579,810    Fields _____ Dec. 25, 1951

UNITED STATES PATENT OFFICE

CERTIFICATE OF CORRECTION

Patent No. 2,861,912                                                              November 25, 1958

Richard Sallmann

It is hereby certified that error appears in the printed specification of the above numbered patent requiring correction and that the said Letters Patent should read as corrected below.

Column 1, line 52, for "radicas" read -- radicals --; line 72, for "and" read -- the --; column 5, line 24, for "0.0" read -- 0.04 --; line 74, for "Examples" read -- Example --.

Signed and sealed this 2nd day of June 1959.

(SEAL)
Attest:

KARL H. AXLINE

Attesting Officer

ROBERT C. WATSON
Commissioner of Patents

Notice of Adverse Decision in Interference

In Interference No. 90,247 involving Patent No. 2,861,912, R. Sallmann, Method for combating pests and preparations suitable therefor, final judgment adverse to the patentee was rendered Sept. 6, 1962, as to claims 1, 2, 3, 4, 5, 7, 8, 10 and 11.

[*Official Gazette January 29, 1963.*]